United States Patent [19]

Phaal et al.

[11] Patent Number: 5,033,334
[45] Date of Patent: Jul. 23, 1991

[54] WIRE DRAWING DIE

[76] Inventors: Cornelius Phaal, 45 Main Street, Johannesburg, Transvaal; Moosa M. Adia, 1966 Peacock Street, Lenasia South, Transvaal; Patrick A. Seeber, 1249 Jukskei Avenue, Weltevreden Park, Roodepoort, Transvaal, all of South Africa

[21] Appl. No.: 521,745

[22] Filed: May 10, 1990

[30] Foreign Application Priority Data

May 12, 1989 [ZA] South Africa ............... 89/3562

[51] Int. Cl.⁵ .............................................. B21K 5/20
[52] U.S. Cl. ............................ 76/107.4; 76/DIG. 12
[58] Field of Search ............... 76/107.1, 107.4, 101.1, 76/DIG. 11, DIG. 12

[56] References Cited

U.S. PATENT DOCUMENTS 2,027,787  1/1936  Ridgway et al. .............. 76/107.4
3,831,428  8/1974  Wentorf, Jr. .................. 76/107.4
4,078,456  3/1978  Foley ........................... 76/107.4

FOREIGN PATENT DOCUMENTS 584016  1/1947  United Kingdom ........... 76/107.4

Primary Examiner—Roscoe V. Parker
Attorney, Agent, or Firm—Scully, Scott Murphy & Presser

[57] ABSTRACT

A wire drawing die blank is produced by providing an abrasive compact core, having top and bottom surfaces and a side surface, depositing a thin layer of high melting metal such as nickel, iron, chromium or cobalt on the side surface, the coating substantially following the contour of the side surface, providing a support having a hole extending therethrough, the hole having a cross-section larger than that of the core and allowing for the core to be located therein, locating the core in the hole leaving a space between the metal coating and the support, introducing a suitable braze, preferably in liquid form, in the space and causing the braze to bond the core to the support.

18 Claims, 1 Drawing Sheet

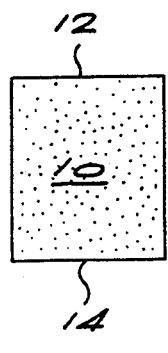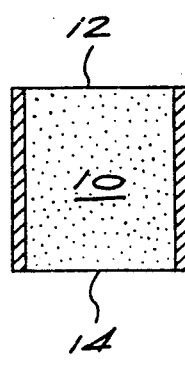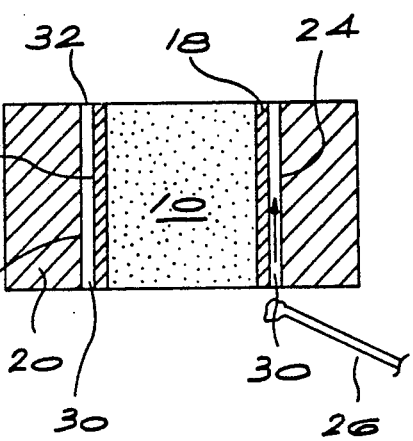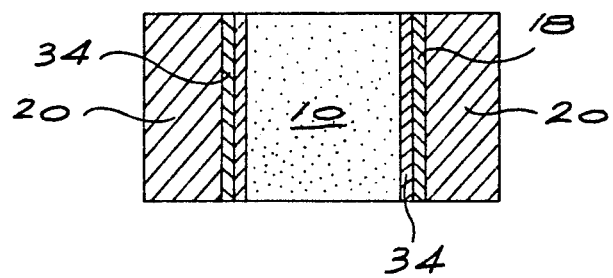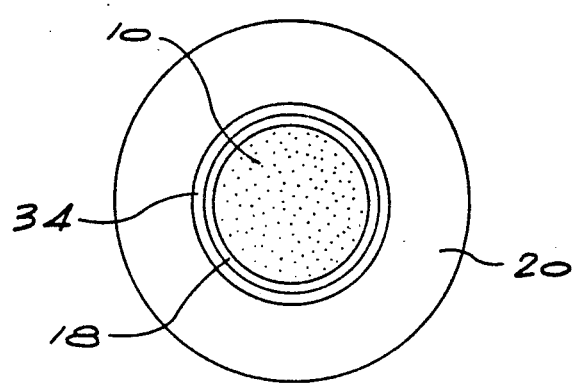

WIRE DRAWING DIE

BACKGROUND OF THE INVENTION

This invention relates to wire drawing dies.

Wire drawing dies consisting of a diamond compact core held in a suitable support are extensively used in industry. The hole through which the wire is drawn is provided axially through the diamond compact core. The support will generally either be a steel or cemented carbide ring.

One method of making these wire drawing dies includes the steps of providing the diamond compact core, providing the support which has a hole extending therethrough, the cross-section of which is slightly smaller than that of the core, heating the support to cause it to expand, sliding the core into the hole, and allowing the support to cool and contract around and on the core. This produces a wire drawing die blank. The wire drawing die is produced from this blank by forming a suitable hole axially through the diamond compact core. The wire drawing die is then mounted in a larger support ring, for use. It is mounted in this larger support ring by brazing the steel or cemented carbide support to the larger ring. In so doing, the support is heated and expands and dislodgment of the core in the support can occur. When there is such dislodgment, the core will no longer lie true in the hole through the support.

An example of a wire drawing die utilising a diamond compact core is described in U.S. Pat. No. 3,831,428.

SUMMARY OF THE INVENTION

According to the present invention, there is provided a method of producing a wire drawing die blank including the steps of providing an abrasive compact core, having top and bottom surfaces and a side surface, depositing a thin coating of a high melting metal or alloy on the side surface, the coating substantially following the contour of the side surface, providing a support having a hole extending therethrough, the hole having a cross-section larger than that of the core and allowing for the core to be located therein, locating the core in the hole leaving a space between the metal coating and the support, introducing a braze, preferably in liquid form, in the space, and causing the braze to bond the core to the support.

DESCRIPTION OF THE DRAWINGS

FIGS. 1a to 1d illustrates schematically the method of the invention, and

FIG. 2 is a plan view of FIG. 1d.

DESCRIPTION OF EMBODIMENTS

The high melting metal or alloy coating which is deposited on the side surfaces of the compact core may comprise two or more layers of different high melting metals. The coating will generally have a thickness of less than 0,05 mm. This layer will generally be deposited using known sputter vacuum techniques, electroless coating, or similar method. The compact preferably has an irregular outer surface and these methods produce a metal layer which follows substantially the contour of this irregular outer surface.

The high melting metal or alloy will have a liquidus temperature exceeding 1200° C. and the ability to bond to the compact and also to the braze. Examples of suitable metals are carbide forming metals such as nickel, iron, chromium and cobalt.

The cross-section of the core will be smaller than that of the hole through the support. Preferable, the hole will receive the core with a slide fit producing a space not exceeding about 100 microns in width between the support and the metal layer.

It is preferred to heat treat the compact core prior to its location in the hole in the support. The heat treatment should take place under conditions which minimise degradation of the abrasive particle of the compact occurring. These conditions will vary according to the nature of the compact. For example, for diamond compacts which are sensitive to temperatures above 700°–750° C., it is preferable to heat treat the compact at, or below this temperature. Generally, the heat treatment should take place close to the liquidus temperature of the braze, e.g. at a temperature within 50° C. of the braze liquidus temperature. The heat treatment will typically be maintained for a period of 20 to 40 minutes.

The heat treatment of the core causes the core to expand. It has been found that on returning to ambient temperature, the core retains its expanded form. The core, thus expanded, reduces the stresses built in to the bonded wire drawing die product and greatly enhances the strength of the bond between the core and the support.

The braze will be introduced into the space between the support and the metal layer in liquid form or as a shim. Preferably, a supply of molten braze will be provided and will be allowed to pass into the space by capillary action.

The braze will preferably be a silver/copper based braze having a liquids temperature in the range 650° C. to 750° C. To improve the flow characteristics of the braze and suppress its melting point, a metal may be included in the braze to achieve this. A suitable metal of this nature is one selected from manganese, cadmium, tin, indium and silcon. Examples of particularly suitable brazes are those sold under the trade names Degussa 5009 ® and Degussa 4900 ®. These brazes have the following compositions:

| Metal | % by weight |
|---|---|
| DEGUSSA 5009 ® | |
| Silver | 50 |
| Copper | 15,5 |
| Zinc | 15,5 |
| Cadmium | 16 |
| Nickel | 3 |
| DEGUSSA 4900 ® | |
| Silver | 49 |
| Copper | 16 |
| Zinc | 23 |
| Manganese | 7,5 |
| Nickel | 4,5 |

Other suitable brazes are silver/copper/tin brazes sold under the trade names Degussa 900 ® and Degussa 400 ®. These brazes have liquidus temperatures in the range 650° C. to 750° C.

The abrasive compact may be any known in the art, typically a diamond or cubic boron nitride compact. The compact is preferably a diamond compact which is also known in the art as polycrystalline diamond or PCD. Diamond compacts which are sensitive to temperatures above 700°–750° C. are described, for example, in U.S. Pat. No. 3,745,623 and British Patent No. 1,489,130. Diamond compacts which are stable at much higher temperatures and which contain a second phase are described, for example, in U.S. Pat. No. 4,793,828 and 4,534,773. All such diamond abrasive compacts are useful in the practice of the invention.

An embodiment of the invention will now be described with reference to the accompanying drawing. Referring to this drawing, a diamond compact core 10 (FIG. 1a) of right circular, cylindrical shape is provided. This core will typically be cut from a larger diamond compact and has top and bottom flat surface 12, 14 and a curved side surface 16 joining these flat surfaces.

The core is heat treated at a temperature of 750° C. in a vacuum. The core expands on this heat treatment. The core remains so expanded on cooling to ambient temperature.

A metal coating 18 is then deposited on the curved side surface 16 (FIG. 1b). The coating 18 has a thickness of 0,015 mm. The outer surfaces of the core 10 are irregular and the metal coating 18 will follow substantially the irregular outer surface 16 on which it is deposited. The metal coating 18 consists of an inner layer of chromium (0,005 mm) deposited by sputter techniques and an outer nickel layer (0,01 mm) electrolessly deposited on the chromium layer.

A cemented carbide support 20 is provided. This support 20 is also right circular, cylindrical in shape and has a hole 22 formed axially therein. The hole is circular in plan and the cross-section of this hole is slightly larger than the metal-coated core 10. The metal-coated core 10 fits into the hole 22 with a sliding fit leaving a space 24 between the support 20 and the metal coating 18 of about 25 microns in width (FIG. 1c).

A braze is thereafter introduced into the space 24 between the metal coating and the support 20 to bond the core firmly to the support. This braze is introduced into the space 24 by placing a rod 26 of the braze at the lower end 30 of the space 24, heating the braze to cause it to melt and heating the support 20 and compact core 10. The molten braze rises up the space 24 by capillary action (see the arrow in FIG. 1c). When the braze emerges from the top 32 of the space 24, the heaing is stopped and the braze allowed to solidify. The braze bonds strongly to the metal coating and to the cemented carbide support producing a wire drawing die blank illustrated by FIG. 1d. In this figure, braze 34 fills space between the metal coating 18 and the support 20.

To produce a wire drawing die from the blank of FIG. 1d, a hole is formed axially through the diamond compact core 10. This wire drawing die will be mounted in a suitable support ring by brazing the cemented carbide support into the ring. In so doing, the carbide support and compact core will be heated. It has been found that the provision of the metal/braze layer allows this heating to take place without causing the core to become dislodged in the hole 22 of the support.

To improve the bond between the core and the support further, the surface of the support defining the hole 22 can have a layer of nickel or other suitable metal diffusion bonded thereto.

We claim:

1. A method of producing a wire drawing die blank including the steps of providing an abrasive compact core, having top and bottom surfaces and a side surface, depositing a thin coating of a high melting metal or alloy on the side surface, the coating substantially following the contour of the side surface, providing a support having a hole extending therethrough, the hole having a cross section larger than that of the core and allowing for the core to be located therein, locating the core in the hole leaving a space between the metal coating and the support, introducing a braze in the space, and causing the braze to bond the core to the support.

2. A method according to claim 1 wherein the core is heat treated at a temperature close to the liquidus temperature of the braze prior to location in the hole.

3. A method according to claim 2 wherein the heat treatment of the core takes place at a temperature within 50° C. of the liquidus temperature of the braze.

4. A method according to claim 1 wherein the coating of high melting metal or alloy has a thickness of less than 0,05 mm.

5. A method according to claim 4 wherein the coating comprises two or more layers, each layer being of a different high melting metal.

6. A method according to claim 1 wherein the metal is selected from nickel, iron, chromium and cobalt.

7. A method according to claim 1 wherein the space between the metal coating and the support has a width not exceeding about 100 microns.

8. A method according to claim 1 wherein the braze is introduced into the space in liquid form.

9. A method according to claim 1 wherein a supply of molten braze is provided and the molten braze is allowed to pass into the space by capillary action.

10. A method according to claim 1 wherein the braze is a braze having a liquidus temperature in the range 650° C. to 750° C.

11. A method according to claim 10 wherein the braze is a silver/copper based braze.

12. A method according to claim 10 wherein the braze contains a metal which is a melting point suppressant and flow improver.

13. A method according to claim 12 wherein the melting point suppressant and flow improver metal is selected from manganese, cadmium, tin, indium and silicon.

14. A method according to claim 10 wherein the braze has the following composition:

| Metal | % by weight |
|---|---|
| Silver | 49 |
| Copper | 16 |
| Zinc | 23 |
| Manganese | 7,5 |
| Nickel | 4,5 |

15. A method according to claim 10 wherein the braze has the following composition:

| Metal | % by weight |
|---|---|
| Silver | 50 |
| Copper | 15,5 |
| Zinc | 15,5 |
| Cadmium | 16 |
| Nickel | 3. |

16. A method according to claim 1 wherein the abrasive compact core has a cylindrical shape.

17. A method according to claim 1 in which the core is a diamond compact.

18. A method according to claim 1, wherein the coating has a liquidus temperature exceeding 1200° C.

* * * * *